Figure 1:
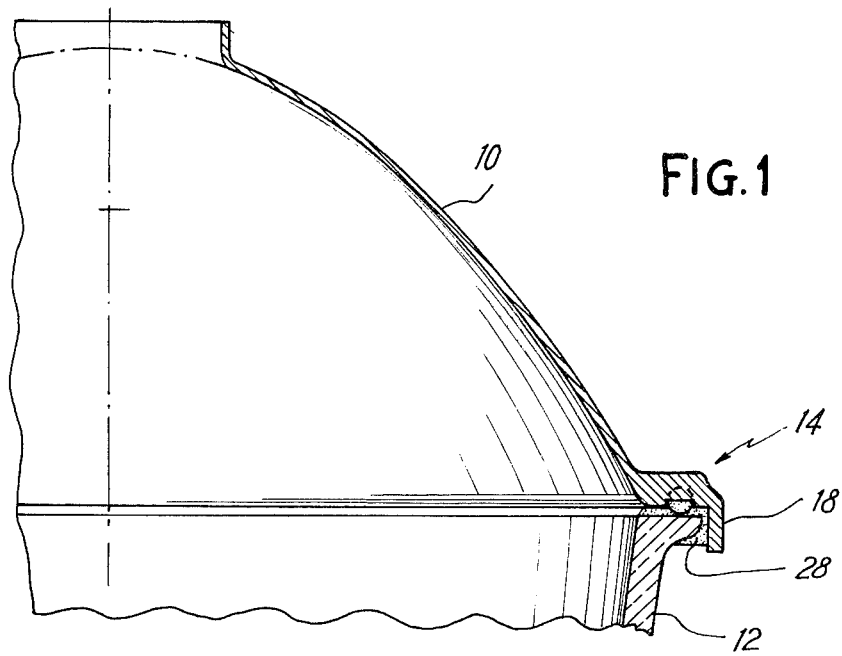

United States Patent [19]

Puyplat

[11] 4,106,969
[45] Aug. 15, 1978

[54] METHOD FOR ASSEMBLING TOGETHER PARTS OF AUTOMOBILE LIGHTS

[75] Inventor: Olivier Puyplat, Paris, France
[73] Assignee: Cibie Projecteurs, Bobigny, France
[21] Appl. No.: 825,633
[22] Filed: Aug. 18, 1977
[30] Foreign Application Priority Data
Sep. 8, 1976 [FR] France ............... 76 27012
[51] Int. Cl.² .............. B29C 19/06; B29D 3/00; C09J 5/00
[52] U.S. Cl. ................ 156/275; 156/303.1; 156/309; 428/222; 428/223
[58] Field of Search ............ 152/272, 275, 303.1, 152/309, 307, 298; 428/222, 223
[56] References Cited
U.S. PATENT DOCUMENTS
3,133,852  5/1964  Crane et al. ............... 428/222
3,700,514  10/1972  Zito, Jr. ............... 156/298
3,746,604  7/1973  Reynolds ............... 428/222

Primary Examiner—Douglas J. Drummond
Attorney, Agent, or Firm—Cullen, Settle, Sloman & Cantor

[57] ABSTRACT

The invention relates to a method for assembling together two parts of headlights or lights for automobile vehicles, the first of said parts being made of an inorganic material and the second of a thermoplastics material not able to be directly fixed to the first by adhesion, wherein a connection element is partially introduced into the second thermoplastics part so that a part of said element projects and acts as free anchoring element, and the two parts are then assembled together by the depositing of a layer of glue which, on the one hand, adheres to the first part and, on the other hand, completely covers the said free anchoring element.

7 Claims, 6 Drawing Figures

METHOD FOR ASSEMBLING TOGETHER PARTS OF AUTOMOBILE LIGHTS

The present invention relates to a method for assembling together parts of headlights or lights for automobile vehicles.

In the manufacture of headlights and various other types of lights for automobile vehicles, a first part made of inorganic matter, such as glass or metal, is to be assembled with a second part made of thermoplastics material, such as polyolefin, which cannot be fixed directly by adhesion on the first part. This problem of assembly is particularly encountered where it is desired to fix a front glass on a reflector made of a polyolefinic material which cannot be glued by presently used adhesives. As best, using very sophisticated glues, which are therefore expensive, a front glass may possibly be assembled with a reflector made of a polyolefinic material, but such a bond between glass and reflector would be of very poor quality, i.e. weakly resistant to vibrations and shocks, and would give only a very poor seal to the sealed beam unit. It should further be noted that such glues, insofar, however, as they exist, are heat-setting resins which have the drawback of being long to dry or to polymerise, this constituting a major disadvantage when they are used in a rapidly moving production line.

A similar problem of assembly is encountered both for headlights and for any other type of vehicle lights; for example, similar difficulties are met with when it is desired to assemble a casing or base made of thermoplastics material with a metallic support plate.

The present invention therefore relates to a novel method for assembly which obviates the above-mentioned drawbacks and which makes it possible, for example, to obtain automobile headlights in which the assembly is mechanically sound and of which the seal is excellent.

The method for assembling together two parts of headlights or lights for automobile vehicles, the first of said parts being made of an inorganic matter and the second of a thermoplastics material not able to be directly fixed to the first by adhesion, is characterised in that a connection element is partially introduced in the second thermoplastics part so that a part of said element projects, thus acting as free anchoring element, and in that the two parts are then assembled by depositing a layer of glue which, on the one hand, adheres to the first part and, on the other hand, completely covers said free anchoring part which, after the adhesive has set, acts as mechanical connection between the two parts.

According to a further feature of the present invention, said connection element used is metallic and is preferably in the form of a helix.

According to another feature of the present invention, in order partially to introduce the connection element in the second part, said connection element is heated for a predetermined length of time and a pressure is applied thereto with a view to causing it to penetrate into the thermoplastics material, the heating being obtained by any means, for example by the resistance effect or by induction.

According to yet another feature of the present invention, a groove is made in the assembly surface of the second thermoplastics part, said groove being adapted to facilitate the correct positioning of the connection element.

Figure 2:
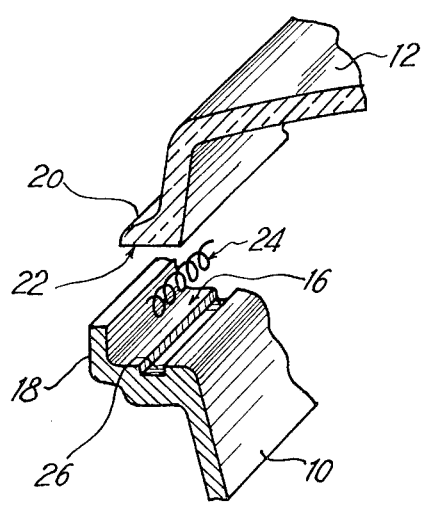
Figure 3:
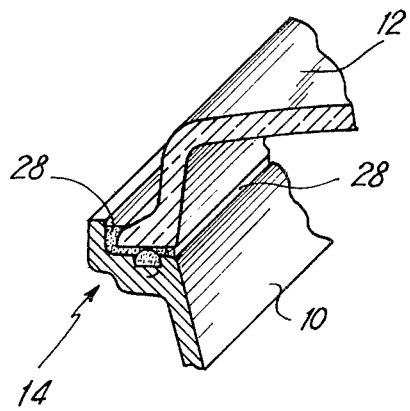
Figure 4:
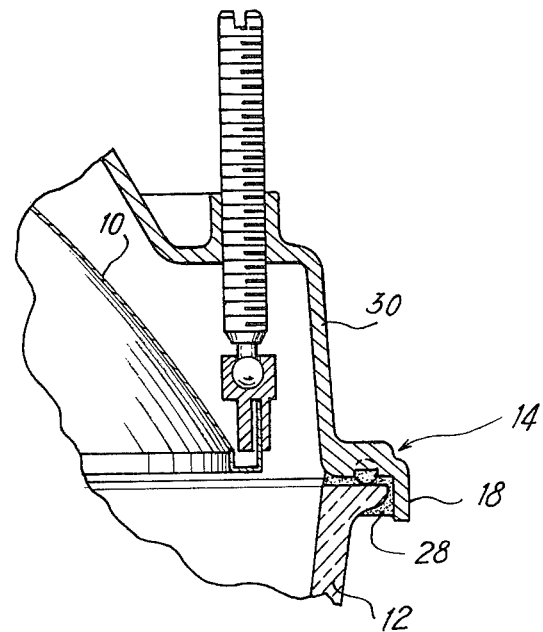
Figure 5:
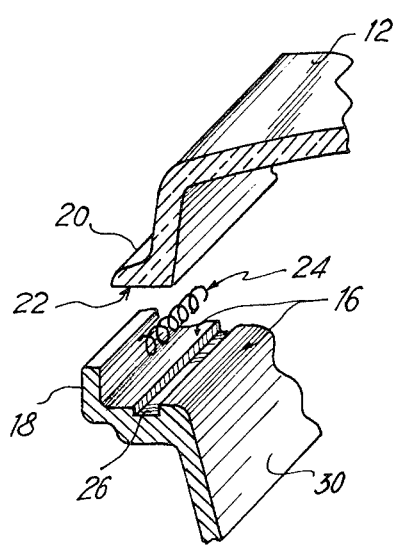
Figure 6:
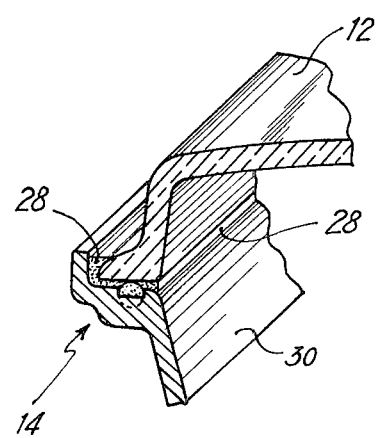

The invention will be more readily understood on reading the following description with reference to the accompanying drawings, in which:

FIGS. 1 to 3 show partial views in section of a sealed beam, before and after assembly of the front glass and the reflector, and FIGS. 4 to 6 show partial views in section of an automobile headlight, before and after the casing and the front glass have been assembled.

In the different Figures, like elements will be designated by like references.

Referring now to the drawings, the reflector 10 shown in FIGS. 1 to 3 and the casing 30 shown in FIGS. 4 to 6 are made of a polyolefinic thermoplastics material, for example polydienes such as isoprenic polydienes among which mention may be made of chloropolyisoprene, chloropolyisoprene-butadiene, oxypolyisoprene, and thiooxypolyisoprene; polyvinylic material such as polyvinylacetals, among which mention may be made of polyvinylacetal, polyvinylbutyral and polyvinylformal; polyvinylesters among which may be mentioned polymethyl-alpha-chloroacrylate, polymethylmethacrylate, polyvinylacetate; polyvinylic halocarbides among which mention may be made of polyvinyl chloride, polyvinyltrifluorochloride; and polyvinylic hydrocarbons such as polybutylene, polyethylene, polymethylstyrene, polystyrene, polyvinylcarbazol, etc...

As has already been mentioned, such materials cannot be satisfactorily assembled with an inorganic material such as for example glass or metal.

In the particular case of FIGS. 1 to 3, the method according to the invention is specifically applied to the assembling of a reflector 10 made of a polyvinylic material, with a front glass 12, made of glass.

The free peripheral edge of the reflector 10 terminates in a peripheral assembly flange 14 having an assembling surface 16 and terminating in a peripheral, upwardly raised edge 18 substantially perpendicular to said surface 16. The corresponding free end of the front glass 12 terminates in a peripheral flange 20, the abutment surface 22 of which is adapted to cooperate with the corresponding assembling surface 16.

The method according to the invention is carried out as follows. A connection element 24 is partially introduced into the thickness of the peripheral assembling flange 14, so that part of said element projects and thus acts as free anchoring element. In this particular case, the connection element 24 used is in the form of a metal helix. The helical form of this connection is extremely advantageous, as it may easily be applied to curvilinear contours. Said metal helix 24 is thus placed on the surface 16 of the peripheral assembling flange 14, and this positioning may be facilitated by the presence of a groove 26. In order partially to introduce said metal helix 24 in the peripheral assembling flange 14, said helix 24 is heated for a predetermined length of time and a pressure is applied thereto with a view to causing it to penetrate into the thermoplastic material of the assembling surface 16. This heating may advantageously be obtained by the resistance effect, but it is also possible to heat by induction. The temporary heating of the metal helix 24 is intended to soften the thermoplastic material, this enabling said helix to penetrate therein under the action of a certain pressure. When the partial penetration of the helix 24 is terminated, the heating is stopped and the thermoplastics material returns into the solid state. When this first stage of the method has been completed, and when the metal helix has partially penetrated into the thickness of the peripheral assembling flange 14, a free anchoring part of this connection element projects from the surface 16 of said flange 14. The reflector 10 and the front glass 12 are then assembled together by a layer of glue 28 being deposited, which layer on the one hand adheres to the flange 20 of the glass 12 and on the other hand completely covers said free anchoring part projecting from the surface 16 of the flange 14. This gluing operation now no longer presents any difficulty since adhesives exist which can glue inorganic matter such as glass. Such a glue, constituted by example by an epoxy resin, adheres perfectly to the peripheral flange 20 of the glass 12 and imprisons the free anchoring part, this resulting, after the glue has set, in a mechanical connection between reflector and front glass. Such a mode of assembly offers an excellent mechanical holding and a very good seal.

The peripheral assembling flange 14 of the reflector 10 advantageously comprises a peripheral raised edge 18 which is adapted to prevent the layer of glue 28 from over-flowing and which in fact enables this layer of glue to surround said peripheral flange 20 at least partly, this obviously leading to a more resistant assembling.

The method according to the invention may also be applied to the assembling of a casing 30 and a front glass 12, as illustrated in FIGS. 4 to 6. This method is carried out in exactly the same way as before, namely the metal helix 24 is heated and a pressure is exerted thereon to cause it to be partly introduced in the thickness of the peripheral assembling flange 14. After cooling and setting of the thermoplastics material, in the vicinity of said metal helix 24, a free anchoring element is obtained, as before, which may be embedded in a layer of glue 28, said glue adhering perfectly to the peripheral flange 20 of the front glass 12.

It is obvious that the method according to the present invention may also be applied to various other types of lights for automobile vehicles. It may in particular be applied to the assembling of light casings made of thermoplastics material with metallic support plates.

What is claimed is:

1. In a method for assembling together two parts of headlights or lights for automobile vehicles, the first of said parts being made of an inorganic material and the second of a thermoplastic material not able to be directly fixed to the first by adhesion, a metallic connection element is partially introduced into the second thermoplastic part so that a part of said element projects and acts as free anchoring element, and the two first and second parts are then assembled by the depositing of a layer of glue which, on the one hand, adheres to the first part and, on the other hand, completely covers the said free anchoring element which, after the glue has set, acts as mechanical connection between the two parts, and wherein, in order partially to introduce said connection element in the second part, said connection element is heated for predetermined length of time and a pressure is applied thereto with a view causing it to penetrate in the thermoplastic material.

2. The method of claim 1, wherein the connection element used is a helix.

3. The method of claim 1, wherein a groove is made on the assembly surface of the second part, intended to facilitate the positioning of the connection element.

4. The method of claim 1, wherein the metallic connection element is heated by the resistance effect.

5. The method of claim 1, wherein the metallic connection element is heated by induction.

6. Application of the method of claim 1 to the assembling of reflectors or casings made of thermoplastics material selectively with glass or with metal support plates.

7. The method of assembling and securing together two parts of headlights or lights for automotive vehicles, wherein the first part is of glass and has a peripheral flange and the second part is a concave reflective body of thermoplastic material having a peripheral assembly surface, comprising the following steps:
   (1) embedding and anchoring down into said peripheral assembly surface a circularly shaped metallic connector element, with a portion thereof projecting above said assembly surface defining a free anchoring element;
   (2) depositing a layer of glue either on said peripheral flange or said peripheral assembly surface;
   (3) and bringing said flange and said surface together and embedding said free anchoring element.

* * * * *